United States Patent [19]

Kozaki

[11] Patent Number: 4,973,137
[45] Date of Patent: Nov. 27, 1990

[54] LIQUID CRYSTAL DISPLAY DEVICE WITH COMPENSATION LAYERS

[75] Inventor: Shyuichi Kozaki, Nara, Japan

[73] Assignee: Sharp Kabushiki Kaisha, Osaka, Japan

[21] Appl. No.: 264,345

[22] Filed: Oct. 31, 1988

[30] Foreign Application Priority Data

Nov. 4, 1987 [JP] Japan ............... 62-278959

[51] Int. Cl.⁵ ........................... G02F 1/133
[52] U.S. Cl. ................. 350/339 R; 350/347 R; 350/347 E
[58] Field of Search .......... 350/347 R, 347 V, 347 E, 350/340, 341, 339 R

[56] References Cited

U.S. PATENT DOCUMENTS

| | | | |
|---|---|---|---|
| 4,019,808 | 4/1977 | Scheffer | 350/347 R |
| 4,080,046 | 3/1978 | Nishizaki | 350/347 R |
| 4,697,884 | 10/1987 | Amstutz et al. | 350/341 X |
| 4,701,028 | 10/1987 | Clerc et al. | 350/347 E X |
| 4,779,960 | 10/1988 | Kozaki et al. | 350/341 X |
| 4,844,569 | 7/1989 | Wada et al. | 350/347 R |

OTHER PUBLICATIONS

T. J. Scheffer, "Liquid Crystal Color Displays", *Nonemissive Electrooptic Displays*, 1975, pp. 45–77.
J. Appl. Phys., vol. 44, No. 11, Nov., 1973, pp. 4799–4803, T. J. Scheffer.
Phase Retarder LCDS, vol. 74, pp. 163–169, P. Andrew Penz, Mol. Cryst. Liq. Cryst., 1981.

*Primary Examiner*—Stanley D. Miller
*Assistant Examiner*—Anita Pellman Gross

[57] ABSTRACT

A liquid crystal display device which comprises first and second electrode substrates spaced a predetermined distance from each other, a nematic liquid crystal layer added with an optically active material and having a positive dielectric anisotropy, which layer is sandwiched between the first and second electrode substrates such that the liquid crystal molecules exhibit a helical structure in which they are twisted in a predetermined twist angle in a direction across the thickness of the liquid crystal layer, a light detecting element positioned on one side of the first electrode substrate remote from the liquid crystal layer, a polarizing element positioned on one side of the second electrode substrate remote from the liquid crystal layer, and a film-like sheet having a birefringence and disposed between the light detecting element and the first electrode substrate, and/or between the polarizing element and the second electrode substrate.

11 Claims, 4 Drawing Sheets

$N'_e$:
$N'_o$:
$d'$:
$\Delta N' = N'_e - N'_o$

Fig. 5
Prior Art
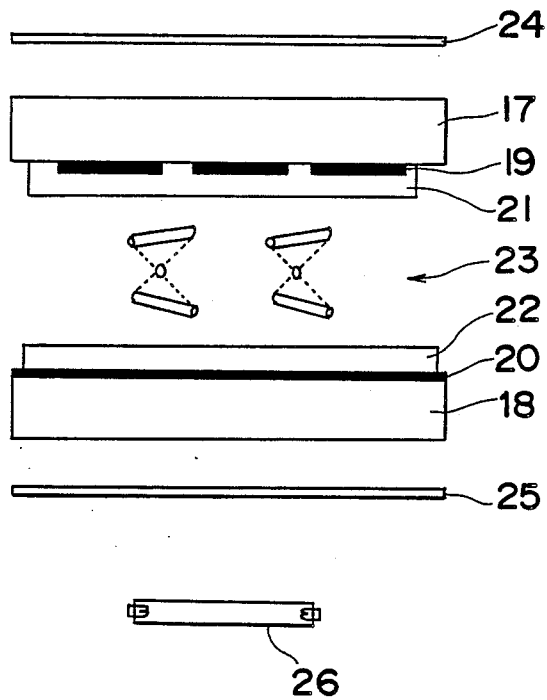
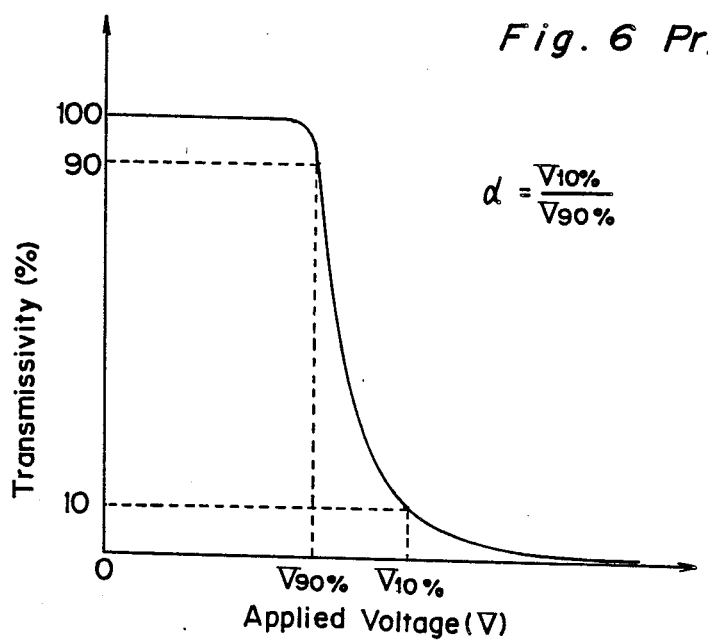
Fig. 6 Prior Art
$$\alpha = \frac{V_{10\%}}{V_{90\%}}$$

LIQUID CRYSTAL DISPLAY DEVICE WITH COMPENSATION LAYERS

BACKGROUND OF THE INVENTION

1. Field of the Invention:

The present invention generally relates to a liquid crystal display device and, more particularly, to a twisted nematic (TN) liquid crystal display device.

2. Background of the Invention:

Liquid crystal display devices are utilized in numerous applications, for example, clocks, wrist watches, electronic calculators, computer terminal devices, word-processor display devices, compact television receiver sets, and so on.

A supertwisted birefringence effect (SBE) display mode in which liquid crystal molecules are twisted to about 180° to about 270° for the purpose of improving the contrast and which is capable of exhibiting an improved multiplex driving characteristic is currently widely used in liquid crystal devices. An example of the liquid crystal display cell using the SBE display mode is schematically illustrated in FIG. 5 of the accompanying drawings, reference to which will now be made.

In FIG. 5, the nematic liquid crystal having a positive dielectric anisotropy is disposed between a pair of electrode-formed substrates 17 and 18. The liquid crystal exhibits a helical structure having a twist angle $\phi$, and orientation is achieved by the use of, for example, a slant vapordeposition method or a rubbing method in which a surface of each of the electrode substrates which is in contact with the liquid crystal contacts is rubbed in one direction with a cloth. An optically active material is added to the nematic liquid crystal so that the ratio of the thickness d of the liquid crystal cell relative to the resultant helical pitch P, that is, d/P, can fall within the range expressed by the following equation.

$$(\phi/2\pi - \tfrac{1}{4}) < d/P < (\phi/2\pi + \tfrac{1}{4})$$

The typical voltage-transmission characteristic curve of the SBE mode liquid crystal cell is illustrated in FIG. 6. The direction in which observation is made is a direction normal to the liquid crystal display surface. In FIG. 6, as a parameter descriptive of a steep characteristic of a threshold characteristic of the voltage-transmission, a value $\alpha$ is defined which stands for the ratio of the voltage $V_{10\%}$, at which the transmission attains 10%, relative to the voltage $V_{90\%}$ at which the transmission attains 90%. As the value $\alpha$ approaches 1, the threshold characteristic becomes steep, and the multiplex driving characteristic improves. In view of this, where a SBE mode liquid crystal cell wherein phenylcyclohexanes are employed as the liquid crystal is used as compared to where a SBE mode liquid crystal cell having a 90° twisted nematic liquid crystal is employed, it has been found that the value $\alpha$ exhibited by the SBE mode liquid crystal cell wherein phenylcyclohexanes are employed is 1.08 whereas the value $\alpha$ exhibited by the SBE mode liquid crystal cell wherein the conventional 90° twisted nematic liquid crystal is employed is 1.40. In this way, it will readily be understood that the SBE mode liquid crystal cell has a very steep threshold characteristic.

FIG. 7 illustrates the dependency of the transmission on the wavelength when the SBE mode liquid crystal display cell is in an ON state and in an OFF state, and FIG. 8 illustrates the dependency of the transmission on the wavelength when the conventional 90° twisted nematic liquid crystal cell is in an ON state and in an OFF state. As can be understood from the respective graphs shown in FIGS. 7 and 8, the dependency of the transmission of the SBE mode liquid display cell on the wavelength is more considerable than that of the twisted nematic liquid crystal cell. This is because the SBE display mode makes use of birefringent effects of the liquid crystal. Accordingly, in the SBE mode liquid crystal cell, it is not possible to accomplish a uniformly switching across the visible light sprectrum and a undesirable coloring therefore occurs in the display, thereby constituting a cause of reduction in display quality.

SUMMARY OF THE INVENTION

In view of the foregoing, the inventor of the present invention has conducted a series of experiments to determine conditions required to achieve a black-and-white display having high quality where no undesirable coloring occurs. As a result thereof, the present invention has for its essential object to provide an improved SBE mode liquid crystal display device wherein a film-like sheet (hereinafter referred to as a compensator plate) having an optically uniaxial property in a direction parallel to a surface thereof is disposed between a light detecting element and the electrode substrate or between a polarizing element and the electrode substrate.

According to the present invention, because of the intervention of the compensator plate, the transmission of the SBE mode liquid crystal cell relative to the wavelength can exhibit a flat characteristic and, therefore, not only can a favorable black-and-white display be obtained, but also a steep threshold characteristic can be exhibited in the voltage-transmission characteristic thereof.

BRIEF DESCRIPTION OF THE DRAWINGS

This and other objects and features of the present invention will become clear from the following description taken in conjunction with a preferred embodiment thereof with reference to the accompanying drawings, in which:

FIG. 5 is a schematic sectional view of the prior art SBE mode liquid crystal display device;

FIG. 6 is a graph showing the applied voltage versus transmission characteristic of the prior art display device of FIG. 5;

DETAILED DESCRIPTION OF THE EMBODIMENT

Figure 1:
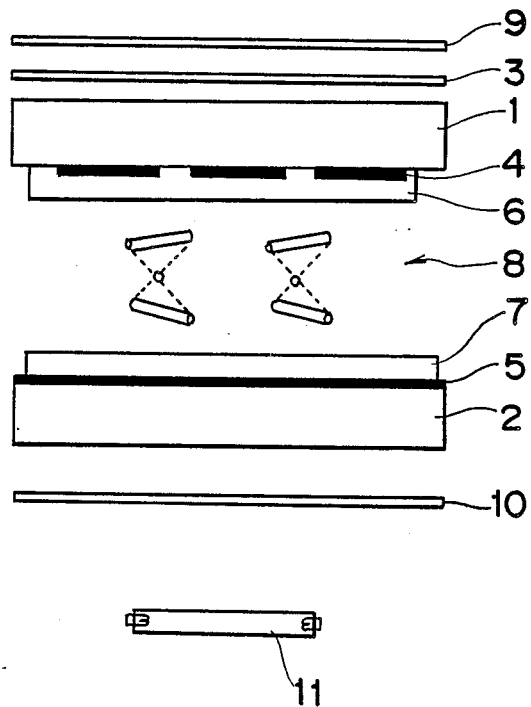
FIG. 1 is a schematic sectional view of a SBE mode liquid crystal display device embodying the present invention.

Referring to FIG. 1, a SBE mode liquid crystal display device embodying the present invention comprises an upper glass substrate 1, a lower glass substrate 2, a compensator plate 3, transparent electrodes 4 and 5, orientation layers 6 and 7, a liquid crystal layer 8, a light detecting element (an upper polarizer plate) 9, a polarizing element (a lower polarizer plate) 10 and a light source 11.

The upper and lower glass substrates 1 and 2 constitute paired electrode substrates positioned one above the other and have formed thereon on respective lower and upper surfaces thereof, with the transparent electrodes 4 and 5 of predetermined pattern made of indium oxide. Surfaces of the transparent electrodes 4 and 5 opposite to the respective glass substrates 1 and 2 are formed with the orientation layers 6 and 7, respectively, which layers 6 and 7 are in the form of a coating of polyimidesilane polymer, the surface of which has been rubbed in a predetermined direction with the use of a cloth.

The liquid crystal layer 8 is positioned between the orientation layers 6 and More specifically, the liquid crystal layer 8 is a layer of nematic liquid crystal added with photo-active material and having a positive dielectric anisotropy and is sandwiched between the orientation layers 6 and 7 so that the liquid crystal molecules can exhibit a helical structure wherein they are twisted at an angle greater than 90° in a direction across the thickness thereof. For the liquid crystal layer 8, the use of phenylcyclohexanes such as listed in Table 1 in a quantity expressed in terms of percentage by weight in this Table is preferred. However, other than the phenylcyclohexanes, biphenyls, pyrimidines and esters may also be employed.

Figure 2:
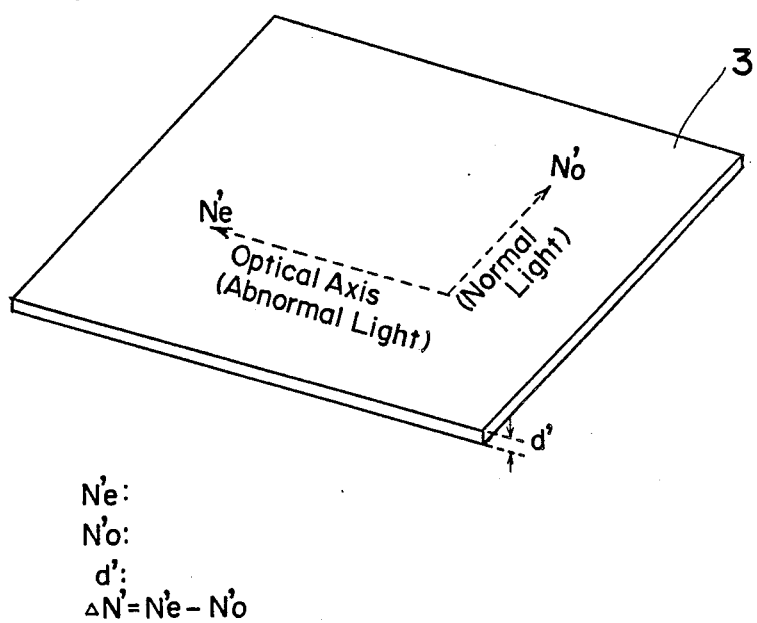
FIG. 2 is a perspective view of a compensator sheet used in the display device embodying the present invention.

Between the upper glass substrate 1 and the light detecting element 9 positioned thereabove, the compensator plate 3 having a birefringence is disposed. As shown in FIG. 2, this compensator plate 3 is formed from a film-like sheet having an optical uniaxial property in a direction parallel to the surface thereof As material for the compensator plate 3, polyesters are preferred. However, a film-like sheet of polyvinyl alcohol, polypropyrene, nylon or acetate can be employed provided that it can exhibit an optical uniaxial property in a direction parallel to the surface thereof. It is to be noted that the compensator plate 3 may be disposed between the lower glass substrate 2 and the polarizing element 10 positioned therebelow or between the upper glass substrate 1. Alternatively, one compensator plate 3 may be disposed between the upper glass plate 1 and the light detecting element 9 and also between the lower glass substrate 2 and the polarizing element 10.

Figure 3:
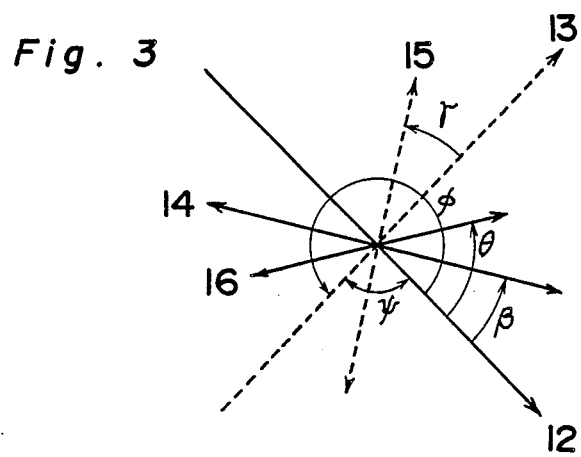
FIG. 3 is a diagram showing various relationships such as rubbing angles in the display device embodying the present invention.

Relationships among the rubbing angle $\Psi$, the twisting angle $\phi$ of the liquid crystal molecules, the set angle $\beta$ of the light detecting element (upper polarizing plate) 9, the set angle $\gamma$ of the polarizing element (lower polarizing plate) 10 and the set angle $\theta$ of the compensator plate 3 are illustrated in FIG. 3. In FIG. 3, the rubbing angle $\Psi$ is the one formed between the rubbing direction 12 of the upper glass substrate 1, that is, the longitudinal direction of the liquid crystal molecules on the upper glass substrate 1, and the rubbing direction 13 of the lower glass substrate 2, that is, the longitudinal direction of the liquid crystal molecules on the lower glass substrate 2. The twisting angle $\phi$ represents that of the liquid crystal molecules and is adjusted to satisfy the relationship of ($\Psi = 360° - \phi$). The twisting angle $\phi$ depends on the ratio d/P of the thickness d of the liquid crystal layer relative to the peculiar helical pitch P induced by the addition of the photo-active material to the nematic liquid crystal and, therefore, it is well known that, in order to render the twisting angle of the liquid crystal molecules to be $\Psi$, the ratio d/P has to be so adjusted as to fall within the range of ($\phi/2\pi - \frac{1}{4}$) < d/P < ($\phi/2\pi + \frac{1}{4}$). Accordingly, the twisting angle $\phi$ is within the range of 0° to 300°. The set angle $\beta$ is the angle formed between the direction 14 of a polarizing axis of the light detecting element 9 and the longitudinal direction 12 of the liquid crystal molecules on the electrode substrate 1 adjacent the light detecting element 9, and the set angle $\gamma$ is the angle formed between the direction 15 of a polarizing axis of the polarizing plate 10 and the longitudinal direction 13 of the liquid crystal molecules on the electrode substrate 2 adjacent the polarizing element 10. The set angle $\theta$ is the angle formed between the direction of the optical axis of the compensator plate 3, made of the film-like sheet having the uniaxial property, and the longitudinal direction 12 of the liquid crystal molecules on the electrode substrate 1.

Figure 4:
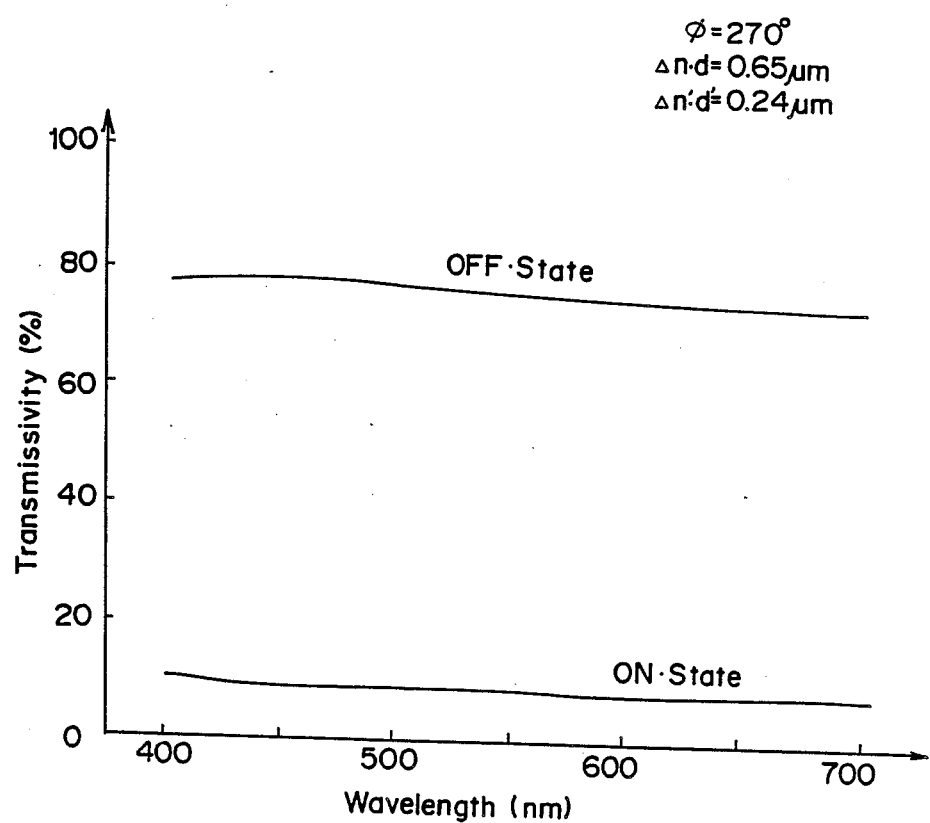
FIG. 4 is a graph showing the dependency of the transmission of the display device of the present invention on the wavelength.
Figure 7:
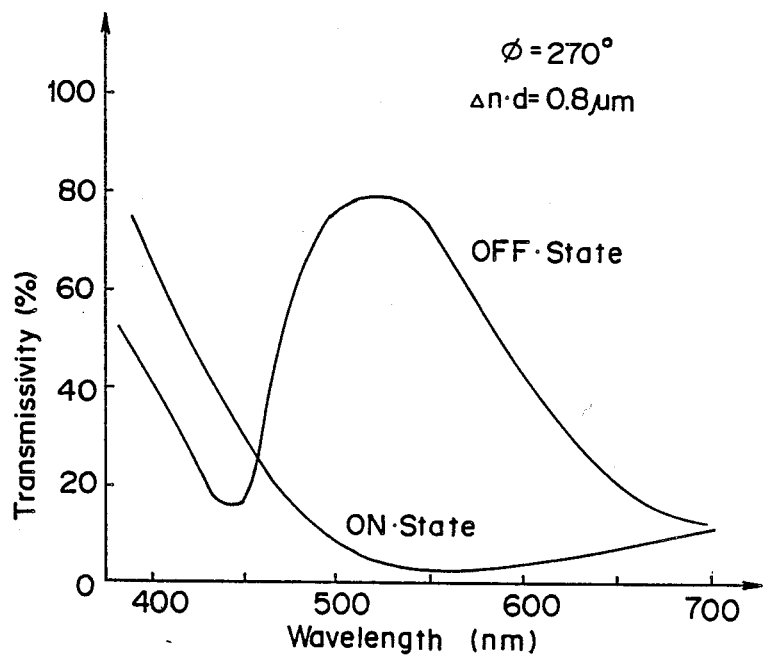
FIG. 7 is a graph showing the dependency of the transmission of the prior art SBE mode liquid crystal display device on the wavelength.
Figure 8:
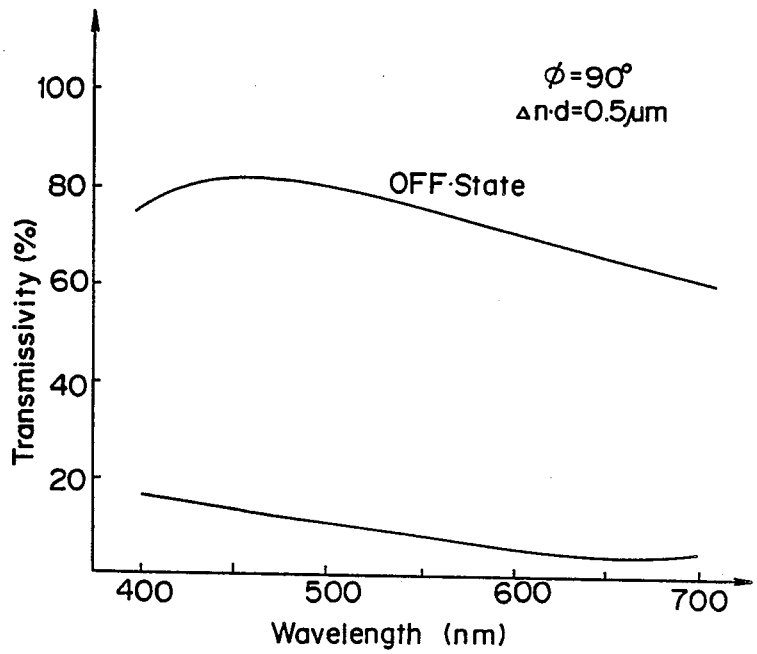
FIG. 8 is a graph showing the dependency of the transmission of the prior art twisted nematic liquid crystal display device on the wavelength.

FIG. 4 illustrates the wavelength-dependent characteristic of the transmission of the SBE mode liquid crystal cell of the above described construction wherein the compensator plate is employed. The liquid crystal material is chosen from the phenylcyclohexanes and exhibits 0.13 in anisotropy $\Delta n$ in refractive index and 5 micrometers in thickness d and, therefore, the value $\Delta n \cdot d$ reads 0.65 micrometer. Also, since the compensator plate 3 is made of polyester and exhibits 0.04 in anisotropy $\Delta n'$ in refractive index in a direction parallel to the surface thereof and 6 micrometers in film thickness d', the value $\Delta n' \cdot d'$ reads 0.24 micrometer. From FIG. 4, it can be readily understood that the transmission of the SBE mode liquid crystal display cell provided with the compensator plate exhibits a sufficiently flat characteristic relative to the wavelength. Also, since the value $\alpha$ in this case is 1.04 while the value $\alpha$ in the case where no compensator plate is utilized as hereinbefore discussed is 1.08, it can also be understood that the multiplex driving characteristic is improved.

In the liquid crystal display element of the construction described above, in order for it to exhibit a sufficiently flat transmission acceptable in practice, it is preferred to make the value $\Delta n \cdot d$ equal to or greater than 0.3 micrometer, but equal to or smaller than 0.9 micrometer. It is also preferred to make the value $\Delta n' \cdot d'$ of the compensator plate 3 equal to or greater than 0.1 micrometer, but equal to or smaller than 0.9 micrometer.

With respect to the set angles $\beta$ and $\gamma$ of the polarizing element 10 and the light detecting element 9, respectively, it is preferred that, assuming that the direction in which the liquid crystal molecules are twisted from the electrode substrate 2 adjacent the polarizing element 10 towards the electrode substrate 1 adjacent the light detecting element 9 is positive, the angles $\beta$, $\gamma$ and $\theta$ are within the respective ranges of ($30° \leq \beta \leq 100°$), ($-10° \leq \gamma \leq 70°$) and ($40° \leq \theta \leq 120°$), or within the respective ranges of ($-60° \leq \gamma \leq 10°$), ($-100° \leq \gamma \leq -20°$) and ($-50° \leq \theta \leq 30°$). By so doing, the wavelength-dependent characteristic of the transmission can be minimized with the consequence that a more favorable black-and-white display can be obtained.

It is to be noted that, even when the nematic liquid crystal having the positive dielectric anisotropy other than the phenylcyclohexanes is employed, and also even when material other than polyesters is used for the film-like sheet having the optical uniaxial property, effects similar to those described above could be exhibited. Moreover, even when the unaxial film-like sheet is interposed between the polarizing element 10 and the electrode substrate 2, effects similar to those described above could be obtained.

The present invention will now be demonstrated by way of an example which is not intended to limit the scope thereof, but is presented only for the purpose of illustration.

EXAMPLE

As a liquid crystal material, the liquid crystal of a composition shown in Table 2 was employed. The twist angle $\phi$ of the liquid crystal molecules was 270° and the thickness d of the liquid crystal layer was 5.0 micrometers. In this liquid crystal, 1.17 wt% of S-811, which is an optically active material manufactured and sold by Merck, had been added so that the twist angle $\phi$ could become 270°. In this example, the value d/P is about 0.65. Also, since the refractive index anisotropy $\Delta n$ of the nematic liquid crystal tabulated in Table 2 is 0.12, the value $\Delta n \cdot d$ is 0.6 micrometer. The set angle $\beta$ of the polarizing plate 9 and the set angle $\gamma$ of the polarizing plate 10 were selected to be 60° and 20° respectively. The angle $\theta$ of the optical axis of the compensator plate 3 was selected to be 30°. The refractive index anisotropy $\Delta n'$ of the compensator plate 3 in the direction parallel to the surface thereof was 0.04 and the film thickness d' of the compensator plate 3 was 6 micometers. Hence, the value $\Delta n' \cdot d'$ is 0.24 micrometer. Under these conditions, the liquid crystal display device has exhibited such a flat transmission characteristic as shown in FIG. 4. The value $\alpha$ is 1.04, and it has been confirmed that the threshold characteristic of the applied voltage versus transmission characteristic was improved.

From the foregoing description, it has now become clear that, since according to the present invention the optically uniaxial film-like sheet is interposed between the light detecting element and the electrode substrate or between the polarizing element and the electrode substrate in the SBE mode liquid crystal display device, the transmission characteristic can exhibit a flat characteristic relative to the wavelength and, therefore, the black-and-white white display of high contrast and, therefore, of high quality can be obtained. Moreover, in the applied voltage versus transmission characteristic, the steep threshold characteristic can be obtained. In view of the foregoing, the present invention can be equally applicable to a graphic display, a character display and a liquid crystal television display.

Although the present invention has fully bee described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

TABLE 1

| Composition | Comp. Ratio (wt %) |
|---|---|
| $C_3H_7$—(H)—(O)—CN | 8.0% |
| $C_5H_{11}$—(H)—(O)—CN | 8.0% |
| $C_3H_7$—(H)—(O)—$OC_2H_5$ | 6.0% |
| $C_3H_7$—(H)—(O)—$OC_4H_9$ | 5.0% |
| $C_3H_7$—(H)—(O)—$C_2H_5$ | 24.0% |
| $C_5H_{11}$—(H)—(O)—(O)—CN | 5.0% |
| $C_5H_{11}$—(H)—(O)—(O)—$C_2H_5$ | 8.0% |
| $C_3H_7$—(H)—(O)—(O)—$C_3H_7$ | 7.0% |
| $C_3H_7$—(H)—(O)—COO—(O)—$C_3H_7$ | 10.0% |
| $C_5H_{11}$—(H)—(O)—COO—(O)—$C_3H_7$ | 7.0% |
| $C_3H_7$—(H)—(H)—(O)—$CH_3$ | 6.0% |
| $C_3H_7$—(H)—(H)—(O)—$C_2H_5$ | 6.0% |

TABLE 2

| Composition | Comp. Ratio (wt %) |
|---|---|
| 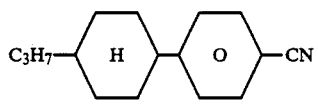 C₃H₇—⬡H—⬡O—CN | 12% |
| 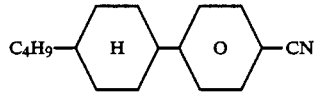 C₄H₉—⬡H—⬡O—CN | 10% |
| 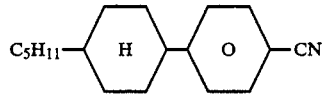 C₅H₁₁—⬡H—⬡O—CN | 10% |
| 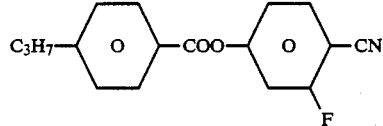 C₃H₇—⬡O—COO—⬡O—CN, F | 6% |
| 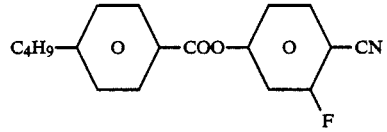 C₄H₉—⬡O—COO—⬡O—CN, F | 6% |
| 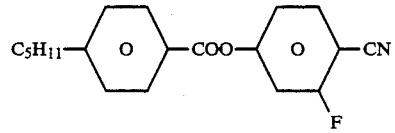 C₅H₁₁—⬡O—COO—⬡O—CN, F | 6% |
| 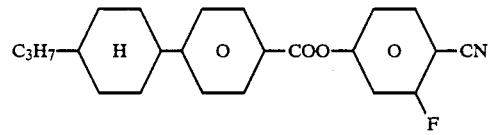 C₃H₇—⬡H—⬡O—COO—⬡O—CN, F | 7.5% |
| 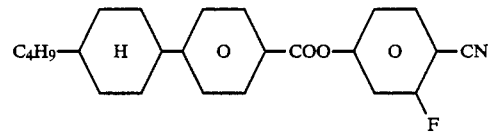 C₄H₉—⬡H—⬡O—COO—⬡O—CN, F | 7.5% |
| 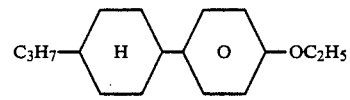 C₃H₇—⬡H—⬡O—OC₂H₅ | 10% |
| 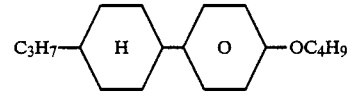 C₃H₇—⬡H—⬡O—OC₄H₉ | 10% |
| 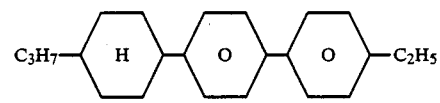 C₃H₇—⬡H—⬡O—⬡O—C₂H₅ | 5% |
| 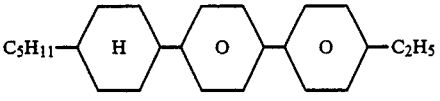 C₅H₁₁—⬡H—⬡O—⬡O—C₂H₅ | 5% |
| 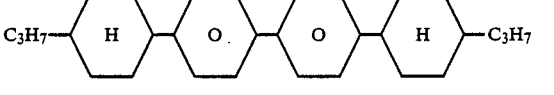 C₃H₇—⬡H—⬡O—⬡O—⬡H—C₃H₇ | 2.5% |
| 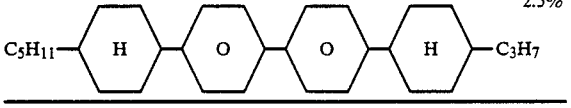 C₅H₁₁—⬡H—⬡O—⬡O—⬡H—C₃H₇ | 2.5% |

What is claimed is:

1. A liquid crystal display device comprising:
   first and second substrates spaced a predetermined distance from each other and having electrodes formed thereon;
   a nematic liquid crystal layer having an optically active material added thereto, said nematic liquid crystal layer having a positive dielectric anisotropy, said nematic liquid crystal layer being sandwiched between the first and second substrates such that the liquid crystal molecules thereof exhibit a helical structure in which they are twisted a predetermined twist angle in a direction across the thickness of the liquid crystal layer, said liquid crystal layer exhibiting an anisotropic differential index of refraction $\Delta n$ and a layer thickness d, the value of $\Delta n \cdot d$ being 0.65 $\mu m$;
   a light detecting element positioned on one side of the first substrate remote from the liquid crystal layer;
   a polarizing element positioned on one side of the second substrate remote from the liquid crystal layer; and
   a film-like sheet having a birefringence and disposed between the light detecting element and the first substrate, said film-like sheet exhibiting an anisotropic differential index of refractive $\Delta n'$ and a layer thickness $d'$, the value of $\Delta n' \cdot d'$ being 0.24 $\mu m$.

2. A liquid crystal display device comprising:
   first and second substrates spaced a predetermined distance from each other and having electrodes formed thereon;
   a nematic liquid crystal layer having an optically active material added thereto, said nematic liquid crystal layer having a positive dielectric anisotropy, said nematic liquid crystal layer being sandwiched between the first and second substrates such that the liquid crystal molecules thereof exhibit a helical structure in which they are twisted a predetermined twist angle in a direction across the thickness of the liquid crystal layer, said liquid crystal layer exhibiting an anisotropic differential index of refraction $\Delta n$ and a layer thickness d, the value of $\Delta n \cdot d$ being 0.65 $\mu m$;
   a light detecting element positioned on one side of the first substrate remote from the liquid crystal layer;

a polarizing element positioned on one side of the second substrate remote from the liquid crystal layer; and a film-like sheet having a birefringence and disposed between the light detecting element and the second substrate, said film-like sheet exhibiting an anisotropic differential index of refraction $\Delta n'$ and a layer thickness $d'$, the value of $\Delta n' \cdot d'$ being 0.24 $\mu m$.

3. A liquid crystal display device comprising:

first and second substrates spaced a predetermined distance from each other and having electrodes formed thereon;

a nematic liquid crystal layer having an optically active material added thereto, said nematic liquid crystal layer having a positive dielectric anisotropy, said nematic liquid crystal layer being sandwiched between the first and second substrates such that the liquid crystal molecules thereof exhibit a helical structure in which they are twisted a predetermined twist angle in a direction across the thickness of the liquid crystal layer, said liquid crystal layer exhibiting an anisotropic differential index of refraction $\Delta n$ and a layer thickness d, the value of $\Delta n \cdot d$ being 0.65 $\mu m$;

a light detecting element positioned on one side of the first substrate remote from the liquid crystal layer;

a polarizing element positioned on one side of the second substrate remote from the liquid crystal layer; and a first film-like sheet having a birefringence and disposed between the light detecting element and the first substrate, said first film-like sheet exhibiting an anisotropic differential index of refractive $\Delta n'$ and a layer thickness $d'$, the value of $\Delta n' \cdot d'$ being within the range of 0.1 to 0.9 $\mu m$.

a second film-like sheet having a birefringence and disposed between the light detecting element and the second substrate, said second film-like sheet exhibiting an anisotropic differential index of refraction $\Delta n'$ and a layer thickness $d'$, the value of $\Delta n \cdot d'$ being 0.24 $\mu m$.

4. The liquid crystal display device of claim 1, wherein said film-like sheet is selected from a group consisting of polyester, polyvinyl alcohol, polypropylene, nylon and acetate.

5. The liquid crystal display device of claim 2 wherein said film-like sheet is selected from a group consisting of polyester, polyvinyl alcohol, polypropylene, nylon and acetate.

6. The liquid crystal display device of claim 3 wherein said film-like sheet is selected from a group consisting of polyester, polyvinyl alcohol, polypropylene, nylon and acetate.

7. A liquid crystal display device comprising:

first and second substrates spaced a predetermined distance from each other and having electrodes formed thereon;

a nematic liquid crystal layer having a positive dielectric anisotropy, said nematic liquid crystal layer being sandwiched between the first and second substrates such that the liquid crystal molecules thereof exhibit a helical structure in which they are twisted a predetermined twist angle in a direction across the thickness of the liquid crystal layer, said liquid crystal layer exhibiting an anisotropic differential index of refraction $\Delta n$ and a layer thickness d, the value of $\Delta n \cdot d$ being 0.65 $\mu m$;

a light detecting element positioned on one side of the first substrate remote from the liquid crystal layer;

a polarizing element positioned on one side of the second substrate remote from the liquid crystal layer; and wavelength-dependent contrast variation compensation means for inhibiting the transmission of wavelength-dependent contrast variation, including a film-like sheet having a birefringence and disposed adjacent one of said substrates opposite said nematic liquid crystal layer.

8. The liquid crystal display device of claim 7 wherein said film-like sheet exhibits an anisotropic differential index of refraction $\Delta n'$ and a layer thickness $d'$, the value of $\Delta n' \cdot d'$ being 0.24 $\mu m$.

9. The liquid crystal display device of claim 8 wherein said film-like sheet is selected from a group consisting of polyester, polyvinyl alcohol, polypropylene, nylon and acetate.

10. The liquid crystal display device of claim 7 wherein said film-like sheet is disposed adjacent said light detecting element.

11. The liquid crystal display device of claim 7 wherein said film-like sheet is disposed adjacent said polarizing element.

* * * * *